United States Patent [19]
Szeliski

[11] Patent Number: 6,137,491
[45] Date of Patent: Oct. 24, 2000

[54] METHOD AND APPARATUS FOR RECONSTRUCTING GEOMETRY USING GEOMETRICALLY CONSTRAINED STRUCTURE FROM MOTION WITH POINTS ON PLANES

[75] Inventor: Richard S. Szeliski, Bellevue, Wash.

[73] Assignee: Microsoft Corporation, Redmond, Wash.

[21] Appl. No.: 09/092,721

[22] Filed: Jun. 5, 1998

[51] Int. Cl.[7] .................................................... G06F 15/00
[52] U.S. Cl. ............................................................ 345/419
[58] Field of Search .................................... 345/419, 421, 345/422, 425, 426, 427, 113, 114, 115

[56] References Cited

U.S. PATENT DOCUMENTS

| | | | |
|---|---|---|---|
| 5,546,530 | 8/1996 | Grimaud et al. | 345/422 |
| 5,761,401 | 6/1998 | Kobayashi et al. | 345/430 |

OTHER PUBLICATIONS

Faugeras, Oliver, "Three–Dimensional Computer Vision: A Geometric Viewpoint," *MIT Press*, Cambridge, Massachusetts, 1993, pp. 245–300.

Hartley, Richard I., "In Defense of the Eight–Point Algorithm," *IEEE Transactions on Pattern Analysis and Machine Intelligence*, vol. 19, No. 6, Jun. 1997, pp. 580–593.

Luong, Q.–T., and Faugeras, O.D., "Determining the Fundamental Matrix with Planes: Instability and New Algorithms," *IEEE Computer Society Conference on Computer Vision and Pattern Recognition*, (CVPR '93), New York, New York, Jun. 1993, pp. 489–494.

Szeliski, Richard and Kang, Sing Bing, "Recovering 3D Shape and Motion from Image Streams Using Nonlinear Least Squares," *Journal of Visual Communication and Image Representation*, vol. 5, No. 1, Mar. 1994, pp. 10–28.

*Primary Examiner*—Phu K. Nguyen
*Attorney, Agent, or Firm*—Michaelson & Wallace; Peter L. Michaelson

[57] ABSTRACT

The invention is embodied in a method for reconstructing 3-dimensional geometry by computing 3-dimensional points on an object or a scene including many objects visible in images taken from different views of the object or scene. The method includes identifying at least one set of initial pixels visible in both the views lying on a generally planar surface on the object, computing from the set of initial pixels an estimated homography between the views, defining at least an additional pixel on the one surface in one of the images and computing from the estimated homography a corresponding additional pixel in the other view, computing an optimal homography and an epipole from the initial and additional pixels (including at least some points not on the planar surface), and computing from the homography and the epipole 3-dimensional locations of points on the object by triangulation between the views of corresponding ones of the pixels. Each of the initial pixels in one of the views corresponds to one of the initial pixels in the other of the views and both correspond to a point on the object.

10 Claims, 6 Drawing Sheets

FRONT
(CAMERA)

FIG. 3A

TOP
(ORTHOGRAPHIC)

FIG. 3B

FRONT
(CAMERA)

FIG. 4A

TOP
(ORTHOGRAPHIC)

FIG. 7A FRONT (CAMERA)

FIG. 7B TOP (ORTHOGRAPHIC)

METHOD AND APPARATUS FOR RECONSTRUCTING GEOMETRY USING GEOMETRICALLY CONSTRAINED STRUCTURE FROM MOTION WITH POINTS ON PLANES

BACKGROUND OF THE INVENTION

1. Technical Field

The present invention relates to the reconstruction of three-dimensional geometry using geometrically constrained structure from motion with points on planes.

2. Background Art

Structure from motion methods typically do not use external geometric constraints, e.g., the coplanarity of certain points or known orientations associated with such planes, until a final post-processing stage. In this specification, we show how such geometric constraints can be incorporated early on in the reconstruction process, thereby improving the quality of the estimates. The approaches we study include hallucinating extra point matches in planar regions, computing fundamental matrices directly from homograpties, and applying coplanarity and other geometric constraints as part of the final bundle adjustment stage. Our experimental results indicate that the quality of the reconstruction can be significantly improved by the judicious use of geometric constraints.

This specification makes reference to publications listed below, each of which is associated section with a reference numeral such as [TK92b], for example.

REFERENCES

[AHP93] A. Azarbayejani, B. Horowitz, and A. Pentland. Recursive estimation of structure and motion using relative orientation constraints. In IEEE Computer Society Conference on Computer Vision and Pattern Recognition (CVPR '93), pages 294–299, New York, New York, June 1993.

[Aya89] N. Ayache. Vision Stéréoscopique et Perception Multisensorielle. InterEditions., Paris, 1989.

[BMV93] B. Boufama, R. Mohr, and F. Veillon. Euclidean constraints for uncalibrated reconstruction. In Fourth International Conference on Computer Vision (ICCV '93), pages 466–470, Berlin, Germany, May 1993. IEEE Computer Society Press.

[BTZ96] P. Beardsley, P. Torr, and A. Zisserman. 3D model acquisition from extended image sequences. In Fourth European Conference on Computer Vision (ECCV '96), volume 2, pages 683–695, Cambridge, England, April 1996. Springer-Verlag.

[Fau92] O. D. Faugeras. What can be seen in three dimensions with an uncalibrated stereo rig? In Second European Conference on Computer Vision (ECCV '92), pages 563–578, Santa Margherita Liguere, Italy, May 1992. Springer-Verlag.

[Fau93] O. Faugeras. Three-dimensional computer vision: A geometric viewpoint. MIT Press, Cambridge, Massachusetts, 1993.

[FL88] O. D. Faugeras and F. Lustman. Motion and structure from motion in a piecewise planar environment. International Journal of Pattern Recognition and Artificial Intelligence, 2(3):485–508, 1988.

[GV96] G. Golub and C. F. Van Loan. Matrix Computation, third edition. The John Hopkins University Press, Baltimore and London, 1996.

[Har94] R. I. Hartley. An algorithm for self calibration from several views. In IEEE Computer Society Conference on Computer Vision and Pattern Recognition (CVPR '94), pages 908–912, Seattle, Washington, June 1994. IEEE Computer Society.

[Har97] R. I. Hartley. In defense of the 8-point algorithm. IEEE Transactions on Pattern Analysis and Machine Intelligence, 19(6):580–593, June 1997.

[HGC92] R. Hartley, R. Gupta, and T. Chang. Stereo from uncalibrated cameras. In IEEE Computer Society Conference on Computer Vision and Pattern Recognition (CVPR '92), pages 761–764, Champaign, Illinois, June 1992. IEEE Computer Society Press.

[HV91] S. v. Huffel and J. Vandewalle. The Total Least Squares Problem: Computational Aspects and Analysis. Society for Industrial and Applied Mathematics, Philadephia, 1991.

[1A96] M. Irani and P. Anandan. Parallax geometry of pairs of points for 3D scene analysis. In Fourth European Conference on Computer Vision (ECCV '96), volume 1, pages 17–30, Cambridge, England, April 1996. Springer-Verlag.

[IRP97] M. Irani, B. Rousso, and S. Peleg. Recovery of egomotion using image stabilization. IEEE Transactions on Pattern Analysis and Machine Intelligence, 19(3):268–272, March 1997.

[KAH94] R. Kumar, P. Anandan, and K. Hanna. Direct recovery of shape from multiple views: A parallax based approach. In Twelfth International Conference on Pattern Recognition (ICPR '94), volume A, pages 685–688, Jerusalem, Israel, October 1994. IEEE Computer Society Press.

[LF93] Q.-T. Luong and O. Faugeras. Determining the fundamental matrix with planes: Instability and new algorithms. In IEEE Computer Society Conference on Computer Vision and Pattern Recognition (CVPR '93), pages 489–494, New York, New York, June 1993.

[LF97] Q.-T. Luong and O. D. Faugeras. Self-calibration of a moving camera from point correspondences and fundamental matrices. International Journal of Computer Vision, 22(3):261–289, March/April 1997.

[LH74] C. L. Lawson and R. J. Hansen. Solving Least Squares Problems. Prentice-Hall, Englewood Cliffs, 1974.

[LH81] H. C. Longuet-Higgins. A computer algorithm for reconstructing a scene from two projections. Nature, 293:133–135, 1981.

[LV94] Q.-T. Luong and T. Viéville. Canonic representations for the geometries of multiple projective views. In Third European Conference on Computer Vision (ECCV '94), volume 1, pages 589–599, Stockholm, Sweden, May 1994. Springer-Verlag.

[MVQ93] R. Mohr, L. Veillon, and L. Quan. Relative 3D reconstruction using multiple uncalibrated images. In IEEE Computer Society Conference on Computer Vision and Pattern Recognition (CVPR '93), pages 543–548, New York, New York, June 1993.

[PFTV92] W. H. Press, B. P. Flannery, S. A. Teukolsky, and W. T. Vetterling. Numerical Recipes in C: The Art of Scientific Computing. Cambridge University Press, Cambridge, England, second edition, 1992.

[PKV98] M. Pollefeys, R. Koch, and L. Van Gool. Self-calibration and metric reconstruction in spite of varying and unknown internal camera parameters. In Sixth International Conference on Computer Vision (ICCV '98), pages 90–95, Bombay, January 1998.

[SA89] M. E. Spetsakis and J. Y. Aloimonos. Optimal motion estimation. In IEEE Workshop on Visual Motion, pages 229–237, Irvine, California, March 1989. IEEE Computer Society Press.

| | |
|---|---|
| [Saw94a] | H. S. Sawhney. 3D geometry from planar parallax. In IEEE Computer Society Conference on Computer Vision and Pattern Recognition (CVPR '94), pages 929–934, Seattle, Washington, June 1994. IEEE Computer Society. |
| [Saw94b] | H. S. Sawhney. Simplifying motion and structure analysis using planar parallax and image warping. In Twelfth International Conference on Pattern Recognition (ICPR '94), volume A, pages 403–408, Jerusalem, Israel, October 1994. IEEE Computer Society Press. |
| [SC94] | R. Szeliski and J. Coughlan. Hierarchical spline-based image registration. In IEEE Computer Society Conference on Computer Vision and Pattern Recognition (CVPR '94), pages 194–201, Seattle, Washington, June 1994. IEEE Computer Society. |
| [Sha94a] | A. Shashua. Projective structure from uncalibrated images: Structure from motion and recognition. IEEE Transactions on Pattern Analysis and Machine Intelligence, 16(8):778–790, August 1994. |
| [Sha94b] | A. Shashua. Trilinearity in visual recognition by alignment. In Third European Conference on Computer Vision (ECCV '94), volume 1, pages 479–484, Stockholm, Sweden, May 1994. Springer-Verlag. |
| [SK94] | R. Szeliski and S. B. Kang. Recovering 3D shape and motion from image streams using nonlinear least squares. Journal of Visual Communication and Image Representation, 5(1):10–28, March 1994. |
| [SK97] | R. Szeliski and S. B. Kang. Shape ambiguities in structure from motion. IEEE Transactions on Pattern Analysis and Machine Intelligence, 19(5):506–512, May 1997. |
| [SN94] | A. Shashua and N. Navab. Relative affine structure: Theory and applications to 3D reconstruction from perspective views. In IEEE Computer Society Conference on Computer Vision and Pattern Recognition (CVPR '94), pages 483–489, Seattle, Washington, June 1994. IEEE Computer Society. |
| [TH84] | R. Y. Tsai and T. S. Huang. Uniqueness and estimation of three-dimensional motion parameters of rigid objects with curved surfaces. IEEE Transactions on Pattern Analysis and Machine Intelligence, PAMI-6(1): 13–27, January 1984. |
| [TK92a] | C. J. Taylor and D. J. Kriegman. Structure and motion from line segments in multiple images. In IEEE International Conference on Robotics and Automation, pages 1615–1621, Nice, France, May 1992. IEEE Computer Society Press. |
| [TK92b] | C. Tomasi and T. Kanade. Shape and motion from image streams under orthography: A factorization algorithm. International Journal of Computer Vision, 9(2):137–154, November 1992. |
| [TM93] | P. H. S. Torr and D. W. Murray. Outlier detection and motion segmentation. In P. S. Schenker, editor, Sensor Fusion VI, pages 432–443. SPIE volume 2059, 1993. Boston. |
| [TM97] | P. H. S. Torr and D. W. Murray. A review of robust algorithms to estimate the fundamental matrix. International Journal of Computer Vision, accepted 1997. |
| [VZR96] | T. Viéville, C. Zeller, and L. Robert. Using collineations to compute motion and structure in an uncalibrated image sequence. International Journal of Computer Vision, 20(3):213–242, 1996. |
| [WAH93] | J. Weng, N. Ahuja, and T. S. Huang. Optimal motion and structure estimation. IEEE Transactions on Pattern Analysis and Machine Intelligence, 15(9):864–884, September 1993. |
| [ZF92] | Z. Zhang and O. Faugeras. Finding clusters of planes from 3D line segments with applications to 3D motion determination. In Second European Conference on Computer Vision (ECCV '92), pages 227–236, Santa Margherita Liguere, Italy, May 1992. Springer-Verlag. |
| [Zha97] | Z. Zhang. Determining the epipolar geometry and its uncertainty: A review. International Journal of Computer Vision, accepted 1997. |

1 Introduction

Structure from motion methods attempt to simultaneously recover the 3D structure of a scene or object and the positions and orientations of the cameras used to photograph the scene. Methods for recovering structure and motion have many applications, such as the construction of 3D environments and pose localization for robot navigation and grasping, the automatic construction of 3D CAD models from photographs, and the creation of large photorealistic virtual environments.

Structure from motion is closely related to photogrammetry, where the 3D location of certain key control points is usually assumed to be known, thereby allowing the recovery of camera pose prior to the estimation of shape through triangulation techniques. In structure from motion, however, very few constraints are usually placed (or assumed) on the geometric structure of the scene being analyzed. This has encouraged the development of mathematically elegant and general formulations and methods, which can be applied in the absence of any prior knowledge.

In practice, however, structure from motion is often applied to scenes which contain strong geometric regularities. The man made world is full of planar structures such as floors, walls, and tabletops, many of which have known orientations (horizontal, vertical) or known relationships (parallelism and perpendicularity). Even the natural world tends to have certain regularities, such as the generally vertical direction of tree growth, or the existence of relatively flat ground planes. A quick survey of many recent structure from motion papers indicates that the test data sets include some very strong regularities (mostly horizontal and vertical planes and lines) which are never exploited [TK92b, BMV93, BTZ96], except perhaps for a final global shape correction.

Why have these available geometric constraints been largely ignored in structure from motion? Partially, it may have been due to a worry that extracting such information makes the techniques less automatic and less general. The difficulty of incorporating such constraints in a statistically valid and numerically stable manner may also be at fault. For example, attempts to base camera pose estimation (Fundamental matrix recovery and epipole recovery) on perspective planar motion estimates (homographies) have proven to be quite brittle [FL88, LF93].

In this specification, we argue that such problems are simply caused by an inappropriate choice of method or intermediate representation. Using external geometric knowledge can never decrease the quality of a reconstruction (assuming the data truly fits the model, e.g., it is truly planar), so long as this knowledge (the constraints) are applied in a statistically valid way. Rather than developing a single method or methodology, we examine a number of different plausible ways to bring geometric constraints to bear, and then evaluate these empirically.

Structure from motion methods are often separated into two phases: an algebraic initialization phase, followed by an iterative maximum likelihood (bundle adjustment) stage. For the initialization phase, three classical techniques are the "8 point" method [LH81], plane+ parallax, and Luong & Faugeras' homography-based method [LF93]. We introduce a fourth method which can be used if some homographies are known (or alternatively, if certain points are known to be co-planar): hallucinating additional correspondences based on the homographies. Our experiments demonstrate that hallucinating such correspondences can improve the results of fundamental matrix estimation (and hence structure), especially in data-poor situations and near critical configurations. In the bundle adjustment phase, we propose adding geometric constraints such as co-planarity and perpendicularity of planes to the minimization.

After a brief review of related literature in Section 2, we present the basic imaging equations, develop the relationships between point positions in two views, and show how this reduces to a homography for the case of coplanar points (Section 3). In Section 4 we preview the three main approaches we will use to solve the structure from motion problem when subsets of points are known to lie on planes: augmenting planes with additional sample points before computing the fundamental matrix (Section 5); using homographies to directly compute the fundamental matrix (Section 6); using plane plus parallax techniques (Section 7); and performing global optimization (bundle adjustment) (Section 8). Section 9 presents our experimental setup. We close with a discussion of the results, and a list of potential extensions to our framework, including the important case of line data.

2 Previous Work

Structure from motion methods can be categorized along several different axes.

First, a distinction is usually drawn between two-frame and three-frame problems, which admit algebraic solutions [LH81, TH84, Fau92, Sha94b] and multi-frame methods which usually require an iterative solution [AHP93, SK94, BTZ96] (the exception being factorization methods [TK92b]). Second, a distinction is made between Euclidean reconstruction techniques based on calibrated images [LH81, TH84] and projective reconstruction techniques based on uncalibrated images [Fau92, HGC92, MVQ93, Sha94a]. (There exist a large variety of techniques in between, including affine reconstruction, and Euclidean reconstruction from uncalibrated image using self-calibration, e.g., by assuming fixed intrinsic parameters [LF97].) Finally, a distinction is made between algebraic techniques, which derive equations and relationships without considering the effects of noise [LH81, TH84, Fau92, Sha94b] and statistically optimal estimation techniques which attempt to reconstruct a 3D scene which best fits the noisy measurements [WAH93, SA89, TK92a, SK94]. A recent paper which combines several of these approaches into an integrated system is [BTZ96]. A good introductory textbook to structure from motion is [Fau93]. Zhang [Zha97] provides a very nice review of fundamental matrix estimation, with an appendix describing least squares projective structure recovery.

Relatively little work has been done on incorporating prior geometric knowledge (e.g., the coplanarity of points, or known feature orientations) directly into the reconstruction process, except perhaps as a final calibration stage [BMV93]. For example, Zhang and Faugeras [ZF92] fit planes to clusters of reconstructed 3D line segments, using a hypothesize and test method to perform the grouping.

There has been some work in exploiting the motion of one or more planes (homographies) for recovering structure and motion. Faugeras and Lustman [FL88] show how to recover the Euclidean motion of a single plane viewed with calibrated cameras. Luong and Faugeras [LF93] show how to directly compute a fundamental matrix from two or more homographies. Both of these techniques, however, seem very noise sensitive. Plane plus parallax technique directly exploit a known dominant planar motion to compute the epipole(s) and perform a projective reconstruction [KAH94, Saw94a, IRP97]. Finally, Vieville et al. [VZR96] show how homographies can be used to recover plane equations once the homography for the plane at infinity has been recovered, and also how to reliably compute the homographies in the first place. However, none of these approaches incorporate the geometric constraints of coplanarity in a statistically optimal fashion.

SUMMARY OF THE INVENTION

The invention is embodied in a method for reconstructing 3-dimensional geometry by computing 3-dimensional points on an object or a scene including many objects visible in images taken from different views of the object or scene. The method includes identifying at least one set of initial pixels visible in both the views lying on a generally planar surface on the object, computing from the set of initial pixels an estimated homography between the views, defining at least an additional pixel on the one surface in one of the images and computing from the estimated homography a corresponding additional pixel in the other view, computing an optimal homography and an epipole from the initial and additional pixels (including at least some points not on the planar surface), and computing from the homography and the epipole 3-dimensional locations of points on the object by triangulation between the views of corresponding ones of the pixels. Each of the initial pixels in one of the views corresponds to one of the initial pixels in the other of the views and both correspond to a point on the object.

DETAILED DESCRIPTION OF THE PREFERRED EMBODIMENTS

Exemplary Operating Environment

Figure 1A:
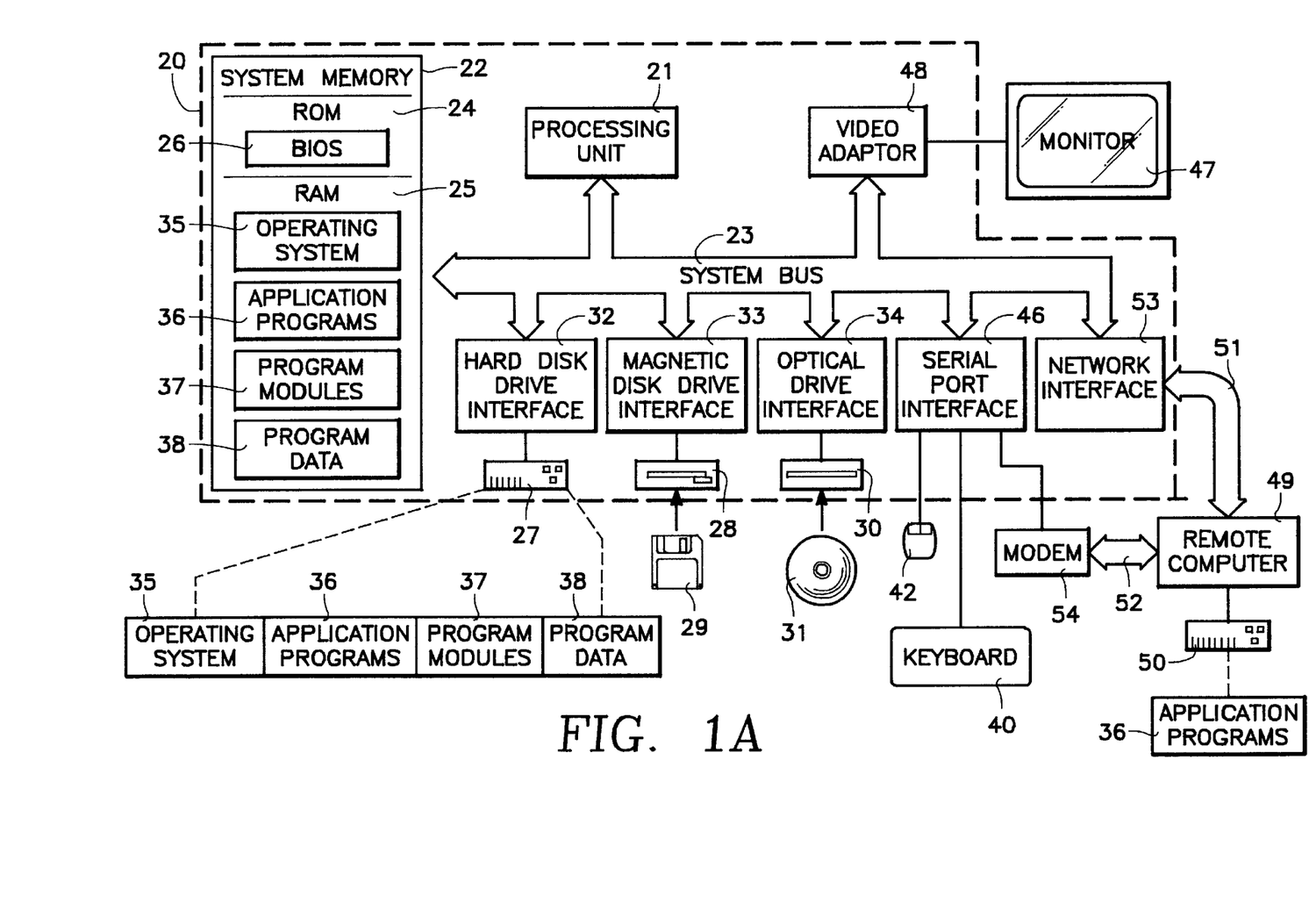
FIGS. 1A and 1B are schematic block diagrams of computer-based apparatus for carrying out the present invention.

FIG. 1A and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located both local and remote memory storage devices.

With reference to FIG. 1A, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), su(h as speakers and printers.

The personal computer 20 may operate in a networked environment using logical connections to one or more remote computers, such as a remote computer 49 The remote computer 49 may be another personal computer, a server, a router, a network PC, a peer device or other common network node, and typically includes many or all of the elements described above relative to the personal computer 20, although only a memory storage device 50 has begin illustrated in FIG. 2A. The logical connections depicted in FIG. 2A include a local area network (LAN) 51 and a wide area network (WAN) 52. Such networking environments are commonplace in offices, enterprise-wide computer networks, intranets and Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 1B:
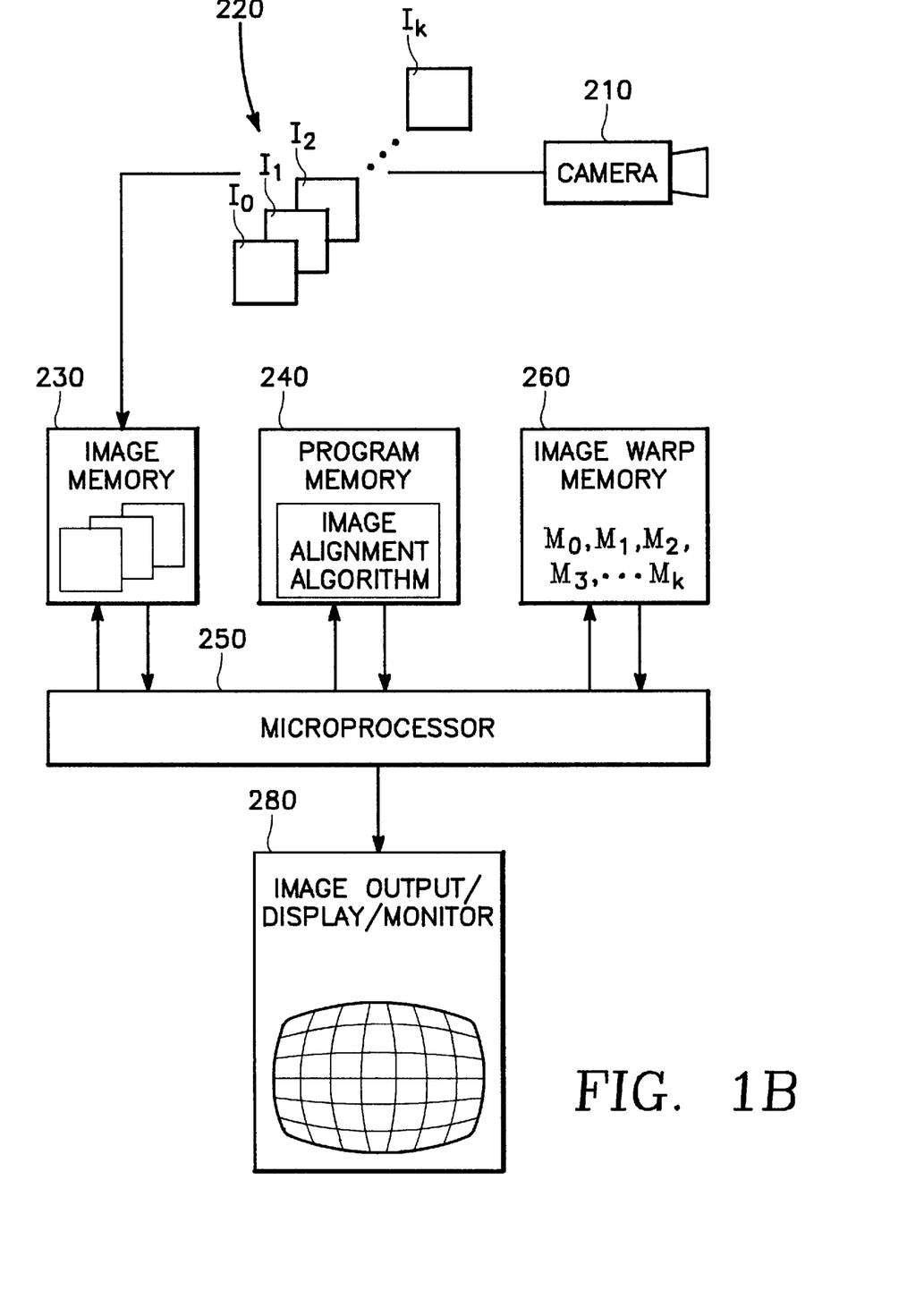

The hardware or apparatus of FIG. 1A may be modified to include additional features in order to (carry out the present invention, as illustrated in FIG. 1B. In FIG. 1B, a camera 210 (such as a digital/electronic still or video camera or film or photographic scanner) captures a sequence of images 220 which are then stored in an image memory 230. The method or processes of the invention are stored as a sequence of program instructions in a program memory 240 for execution by a microprocessor 250. The microprocessor 250, in carrying out the instructions it fetches from the program memory 240, fetches individual ones of the images stored in the image memory 230 and computes a transformation or camera matrix M for each image. The collection of camera matrices M generated by the microprocessor 250 are stored in an image warp memory 260. From these, the microprocessor, in carrying out other program instructions stored in the program memory 240, reconstructs locations of 3-dimensional points in the scene in the manner described below in this specification.

3 General Problem Formulation

Figure 2:
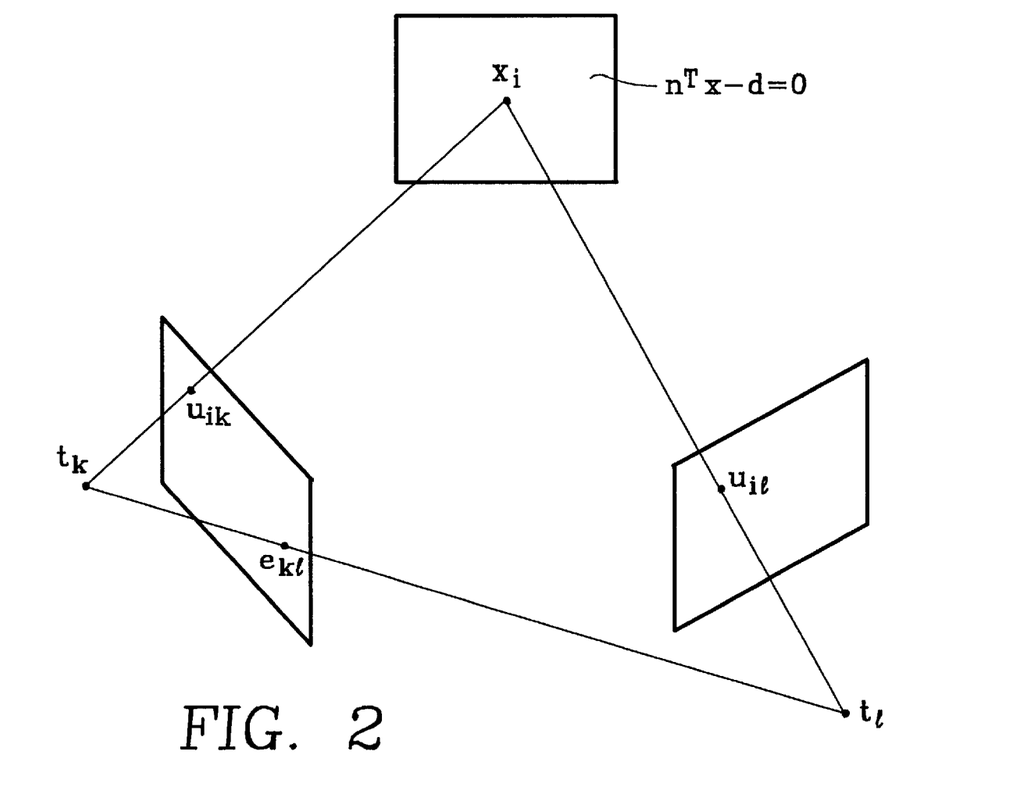
FIG. 2 is a diagram illustrating the geometry employed in the description of this specification for computing 3-dimensional structure from image motion between cameras.

Structure from motion can be formulated as the recovery of a set of 3-D structure parameters $\{x_i=(X_i, Y_i, Z_i)\}$ (illustrated in FIG. 2) and time-varying motion parameters $\{(R_k, t_k)\}$ (illustrated in FIG. 2) from a set of observed image features $\{u_{ik}=(u_{ik}, v_{ik}, 1)\}$ (also illustrated in FIG. 2). In this section, we present the forward equations, i.e., the rigid body and perspective transformations which map 3-D points into 2-D image points with reference to FIG. 2. We also derive the homography (planar perspective transform) which relates two views of a planar point set.

Referring again to FIG. 2, in order to project the ith 3-D point $x_i$ into the kth frame at location $u_{ik}$, we write $$u_{ik} \sim V_k R_k(x_i - t_k), \quad (1)$$

where ~ indicates equality up to a scale (equality in $\rho^2$), $R_k$ is the rotation matrix for camera k, $t_k$ is the location of its optical center, and $V_k$ is its projection matrix (usually assumed to be upper triangular or some simpler form, e.g., diagonal). In most cases, we will assume that $R_0 = I$ and $t_0 = 0$, i.e., the first camera is at the world origin. The location of a 3D point corresponding to an observed image feature is $$x_i = w_{ik} R_k^{-1} V_k^{-1} u_{ik} + t_k, \quad (2)$$

where $w_{ik}$ is an unknown scale factor.

It is useful to distinguish three cases, depending on the form of $V_k$. If $V_k$ is known, we have the calibrated image case. If $V_k$ is unknown and general (upper triangular), we have the uncalibrated image case, from which we can only recover a projective reconstruction of world [Fau93]. If some information about $V_k$ is known (e.g., that it :is temporally invariant, or that it has a reduced form), we can apply self-calibration techniques [Har94, LF97, PKV98].

The location of a point in image k as a function of its location in image l can thus be written as $$u_{ik} \sim V_k R_k(w_{il} R_l^{-1} V_l^{-1} u_{il} + t_l - t_k) \sim V_k R_{kl} V_l^{-1} u_{il} + w_{il}^{-1} e_{kl} = H_{kl}^{\infty} u_{il}^{-1} e_{kl} \quad (3)$$

with $R_{kl} = R_k R_l^{-1}$. The matrix $H_{kl}^{\infty} = V_k R_{kl} V_l^{-1}$ is the homography (planar perspective transform) which maps points at infinity ($w_{il}^{-1} = 0$) from one image to the next, while $e_{kl} = V_k R_k(t_l - t_k)$ is the epipole which is the vanishing point of the residual parallax vectors once this planar perspective motion has been subtracted (the epipole is also the image of camera k's center in camera l's image, as can be seen by setting $w_{il} \to 0$).

When the cameras are uncalibrated, i.e., the $V_k$ can be arbitrary, the homography $H_{kl}^{\infty}$ cannot be uniquely determined, i.e., we can add an arbitrary matrix of the form $e_{kl} v^T$ to $H_{kl}^{\infty}$ and subtract a plane equation $v^T u_k$ from $w_{il}^{-1}$ and still obtain the same result. More globally, the reconstructed 3D shape can only be determined up to an overall 3D global perspective transformation (collineation) [Fau93, SK94].

The inter-image transfer equations have a simpler form when x is known to lie on a plane $n^T x - d = 0$. In this case, we can compute $w_{il}$ using $$n^T x_i - d = w_{il} n^T R_l^{-1} V_l^{-1} u_{il} + n^T t_l - d = 0,$$

or $$w_{il}^{-1} = n^T R_l^{-1} V_l^{-1} u_{il}/(d - n^T t_l) = d_l^{-1} n^T R_l^{-1} V_l^{-1} u_{il},$$

where $d_l = d - n^T t_l$ is the distance of camera center l ($t_l$) to the plane (n, d). Substituting $w_{il}^{-1}$ into (3) and multiplying through by $d_l$, we obtain [VZR96]

$$u_{ik} \sim (H_{kl}^{\infty} + d_l^{-1} e_{kl} n^T R_l^{-1} V_l^{-1}) u_{il}. \quad (4)$$

Letting $\tilde{n}_l = V_l^{-T} R_l n$ be the plane normal in the lth camera's (scaled) coordinate system, we see that the homography induced by the plane can be written as $$H_{kl} \sim H_{kl}^{\infty} + d_l^{-1} e_{kl} \tilde{n}_l^T \quad (5)$$

i.e., it is very similar in form to the projective ambiguity which arises when using uncalibrated cameras (this also forms the basis of the plane plus parallax techniques discussed below).

4 Structure from Motion with Planes

In the remainder of this specification, we develop a number of techniques for recovering the structure and motion of a collection of points seen with 2 or more cameras. In addition to being given the estimated position of each point in two or more images, we also assume that some of the points are coplanar (this only becomes interesting if more than triplets of coplanar points are given, of course). We may also be given one or more image regions where the inter-frame homographies are known, but no explicit correspondences have been given.

Given this information, there are several ways we could proceed.

1. We can, of course, solve the problem ignoring our knowledge of coplanarity (Section 5). This will serve as our reference method against which we will compare all others.
2. We can hallucinate (additional) point matches based on the homographies which are either given directly or which can be computed between collections of coplanar points (Section 5.1). It is this method which is a primary focus of the present invention.
3. We can re-compute the 2D point locations so that the estimated or computed homographies are exactly satisfied (Section 5.2).
4. We can directly compute the fundamental matrix from a collection of homographies (Section 6).
5. We can use plane+ parallax techniques to recover the camera geometry, and after that the 3D structure (Section 7).
6. We can perform a global optimization (bundle adjustment, Section 8), using the knowledge about coplanarity as additional constraints to be added to the solution.

Figure 3A:
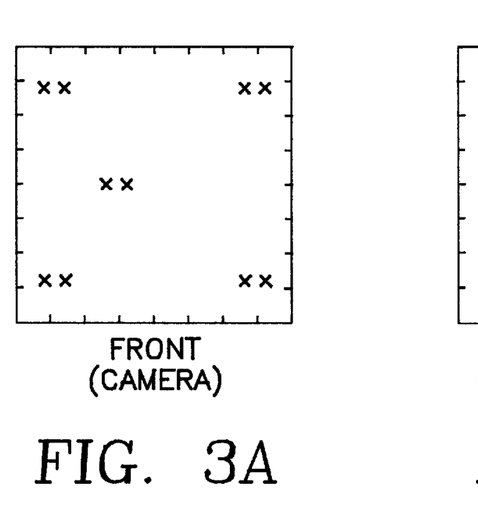
FIGS. 3A and 3B illustrate front and top views (respectively) of an experimental data set of n points lying on a plane with m points lying in front, where n is 5 and m is 4.
Figure 3B:
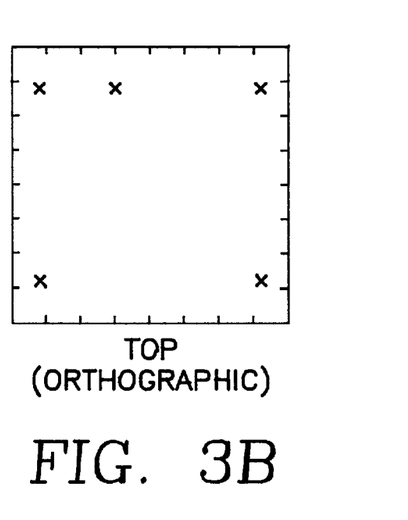
Figure 4A:
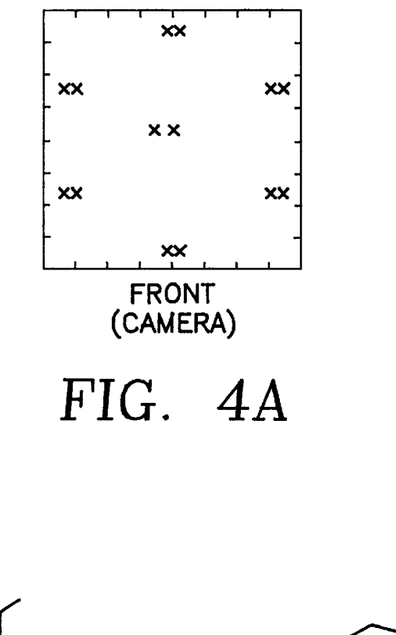
FIGS. 4A and 4B illustrate front and top views, respectively, of an experimental data set of n points lying on each face of a tilted cube, where n is 4.
Figure 4B:
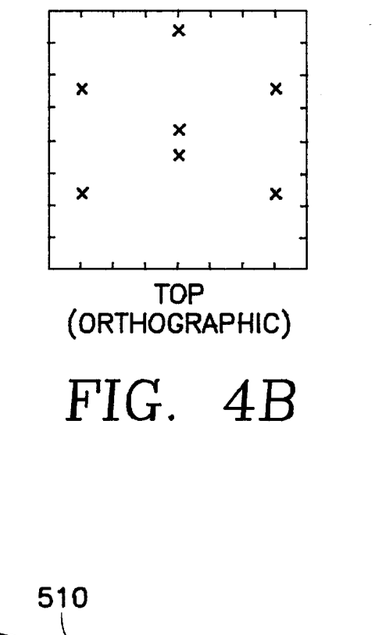

To illustrate these various methods, two exemplary simple data sets illustrated in FIGS. 3 and 4 are employed. FIG. 3A (front view) and FIG. 3B (top view) illustrate n points lying on a plane with m points lying in front (n=5, m=4 shown). FIG. 4A (front view) and FIG. 4B (top view) illustrate n points on each face of a tilted cube (n=4 shown), with points along the cube's edge being shared. Symbols indicate the plane(s) to which points belong; gray symbols (in front views) show the positions in the second frame. For our experiments, we use $t_0 = 6$ and rotate the data around the vertical axis through 10°.

Although we could, we will not use data sets where homographies are directly given. Instead, we compute whatever homographies we need from the (noisy) 2D point measurements, and use these as inputs. A more detailed explanation of our data and methodology is given in Section 9.

5 Fundamental Matrices from Point Correspondences

The fundamental matrix or essential matrix approach to two-frame structure from motion is one of the most widely used techniques for structure from motion, and some recent modifications have made this technique quite reliable in practice [TM93, Har97, Zha97]. The essential matrix method was first developed for the calibrated image case [,LH81, TH84]. This method was then generalized to the fundamental matrix approach [Fau92, HGC92, MVQ93], which can be used with uncalibrated cameras.

Referring back to the basic two-frame transfer equation (3), we can pre-multiply both sides by $[e_{kl}]_\times$, where $[v]_\times$ is the matrix form of the cross-product operator with vector v, to obtain $[e_{kl}]_x u_{ik} \sim [e_{kl}]_x V_k R_{kl} V_l^{-1} u_{il}$ (since $[e_{kl}]_x$ annihilates the $e_{kl}$ vector on the right hand side). Pre-multiplying this by $u_{ik}^T$, we observe that the left-hand side is 0 since the cross product matrix is skew symmetric, and hence $$u_{ik}^T F_{kl} u_{il} = 0, \quad (6)$$

where $$F_{kl} \sim [e_{kl}]_x V_k R_{kl} V_l^{-1} = [e_{kl}]_x H_{kl}^\infty \quad (7)$$

is called the fundamental matrix [Fau93]. The fundamental matrix is of rank 2, since that is the rank of $[e_{kl}]_x$, and has seven degrees of freedom (the scale of F is arbitrary).

When the camera calibration is known, we can premultiply screen coordinates by $V^{-1}$ (i.e., convert screen coordinates into Euclidean directions), and obtain the simpler essential matrix, $E \sim [t_{kl}]_x R_{kl}$, which has two identical non-zero singular values, and hence 5 degrees of freedom (the fundamental matrix has 7).

The usual way to estimate the fundamental matrix is the linear or 8-pt method [Har97], which uses a total least squares formulation [HV91, GV96], $$\min_{F_{kl}} \sum_i u_{ik}^T F_{kl} u_{il}. \quad (8)$$

Total least squares is only statistically valid if all of the entries multiplying the unknowns (the $f_{vn}$ entries) have identically distributed random noise. This is definitely not the case with the variables in (8), which are the entries in the outer product matrix $u_{ik} u_{il}^T$.

However, by carefully re-scaling the entries in $u_{ik}$ and $u_{il}$, Hartley has shown that reasonably accurate estimates can be obtained [Har97]. (Hartley's analysis, however, does not seem to have noticed the relationship to total least squares, and attributes the problem with previous eight-point method implementations to poor conditioning as opposed to biased and anisotropic noise.) More accurate, iterative, techniques for estimating the fundamental matrix are discussed in [TM97, Zha97], but we will not pursue these in this specification, since we are more interested in seeing the improvements available with geometric constraints.

Once the fundamental (or essential) matrix has been computed, we can estimate $e_{kl}$ as the left singular vector of $F_{kl}$ with the smallest singular value. The size of this singular value is an estimate of the dispersion of the epipolar line constraints used to compute $F_{kl}$ in the linear method. We can then re-compute a rank-two $F_{kl}$ from its SVD by zeroing the smallest singular value (in the case of $E_{kl}$, we can also reset the two singular values to 1), and then compute the desired homography $H_{kl}^\infty = [e_{kl}]_x F_{kl}$ [LV94]. Finally, the 3D location of each point can then be obtained by triangulation, and in our experiments, this can be compared to the known ground truth.

As mentioned earlier, when we know that certain points are coplanar, we can use this information in one of two ways: (1) hallucinate (additional) point matches based on the homographies; or (2) re-compute the 2D point locations so that the estimated or computed homographies are exactly satisfied.

5.1 Hallucinating Additional Correspondences

The first method to be described in this specification is that of the present invention and is useful in data-poor situations, e.g., when we only have four points on a plane, and two points off the plane. In this method, by hallucinating additional correspondences, we can generate enough data (say, two additional points on the plane) to use a regular 8-point method. If it helps for data poor situations, why not for other situations as well (say, eight points grouped onto two planes)? Eventually, of course, the new data must be redundant, but at what point? Methods which exploit homographics directly [LF93] (Section 6) indicate that there are six independent constraints available from a single homography. Is this so when the data is noisy?

Figure 5:
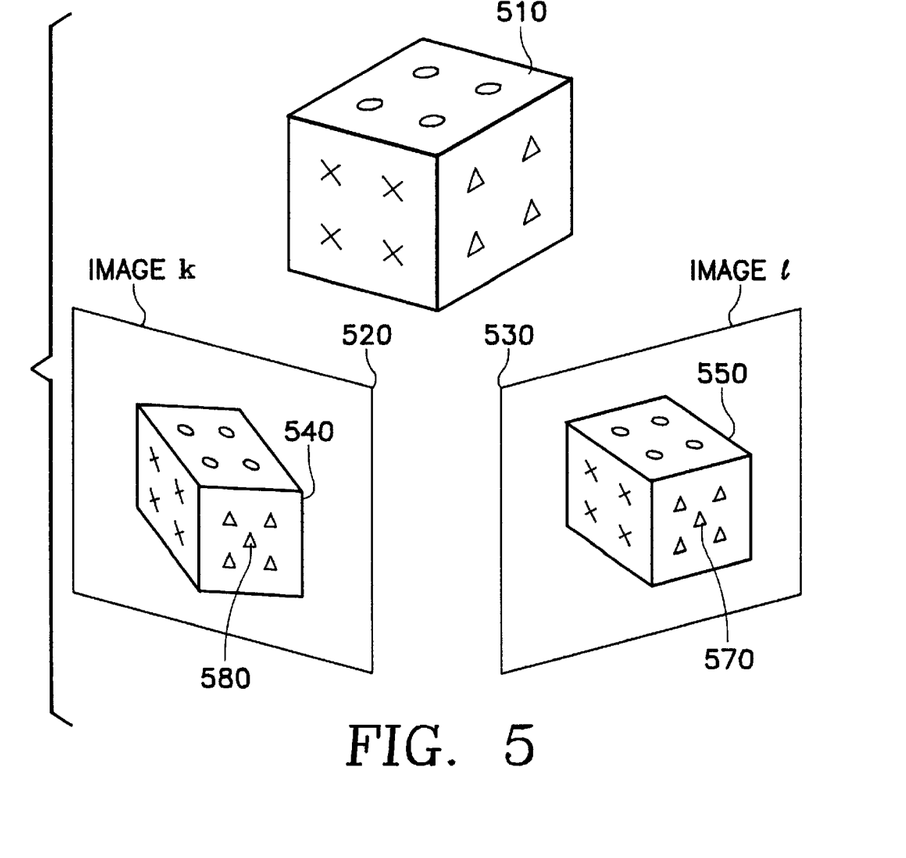
FIG. 5 illustrates the projection of a 3-dimensional structure (a cube) onto two different camera planes and how additional points on a cubic plane are added to enhance the computation of the 3-dimensional structure in accordance with the present invention.

Referring to FIG. 5, a 3-dimensional object such as a cube 510 has its image projected onto two different camera planes 520, 530 to provide respective 2-dimensional images 540, 550. Each of the visible faces of the cube 510 is defined in the original camera images by only four points (as illustrated in FIG. 5). In accordance with the method of the present invention, at least one additional point 570, 580 is added in image memory to at least one cube face so that a total of five points lies on the cube face or plane. (Preferably, such a point is added to more than one cube face or to all cube faces.) A total of one or more points are added in this manner ("hallucinated"). Thereafter, the fundamental matrix process for computing 3-dimensional structure is invoked, but using not only the four original points in each plane but also the additional points which have been added ("hallucinated"). The addition of such synthetic information is readily accomplished by adding corresponding pixel data into the image memory in the computer. As illustrated in FIG. 5, at least one such point is added onto at least one planar surface visible in both camera planes 520, 530 (or, preferably, several or all planar surfaces). This step incorporates into the fundamental matrix process the additional information (heretofore ignored) that certain sets of points visible in both camera planes 520, 530 are co-planar. Such information improves the performance of the fundamental matrix process described in the foregoing section, a significant advantage. FIG. 5 corresponds to the image memory structure in the computer system of FIG. 1 for a single visible 3-dimensional object.

Figure 6:
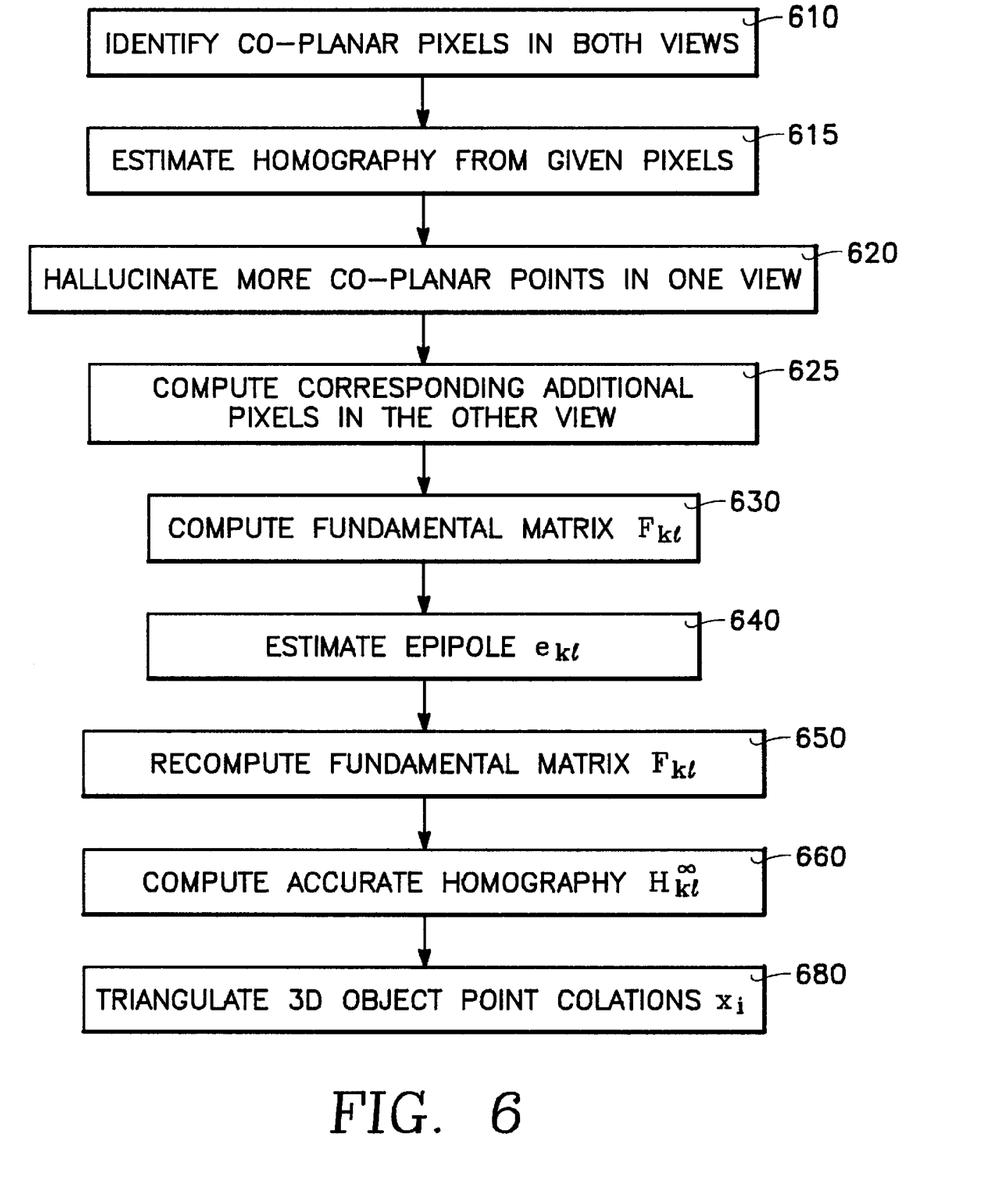
FIG. 6 is a block flow diagram illustrating a preferred method of the present invention.

Referring now to FIG. 6, the method of the present invention proceeds as follows. First, upon acquisition of the image of the same 3-dimensional object in the two different camera planes 520, 530 (of FIG. 5), a set co-planar points visible in both camera planes is identified for each commonly visible planar surface on the object (block 610 of FIG. 6). An initial estimate of the homography between the two sets of coplanar points is obtained from the set of coplanar points identified in the previous step (block 615 of FIG. 6). Next, an additional point (or points) on at least one planar surface (or more than one planar surface) is added in one of the two camara planes (in the representation stored in computer image memory) (block 620 of FIG. 6). This is one part of the "hallucination" step illustrated in FIG. 5. The other part is to compute from the initial estimated homography the corresponding additional pixels in the other image (block 625 of FIG. 6). This completes the process of hallucinating pixels in each of the images corresponding to additional points on the planar surface of the object. Preferably, the hallucinated pixel or pixels are placed within a neighborhood or region surrounded by the originally identified pixels on the planar surface of the object. It has been found that where only four points on the planar surface are initially identified, the additional of about two hallucinated points is optimal.

The fundamental matrix is computed in accordance with Equation 8 from all (or at least a significant portion) of the commonly visible points in the two images, including the hallucinated points synthesised in the previous step (block 630 of FIG. 6). Once the fundamental (or essential) matrix has been computed, we estimate the epipole $e_{kl}$ as the left singular vector of $F_{kl}$ with the smallest singular value (block 640 of FIG. 6). The size of this singular value is an estimate of regular data sets, which do not lie on critical surfaces. Note that hallucinating point can convert a poorly conditioned problem into one which is easily soluble.) For the fourth and fifth data set (n=m=4 two-plane), hallucinating correspondences actually does better than either plane plus parallax, or

| data set | n | m | p | N | method | Euclidean | affine | projective | coplanarity |
|---|---|---|---|---|---|---|---|---|---|
| plane + 2 pts | 4 | 2 | 2 | 8 | "8 pt" F | 0.0651 | 0.0130 | 0.0041 | 0.0023 |
| " | 4 | 2 | 0 | 6 | plane + ‖ax | 0.0651 | 0.0130 | 0.0041 | 0.0024 |
| plane + 2 pts | 6 | 2 | 0 | 8 | "8 pt" F | 0.8551 | 0.6543 | 0.6059 | 0.0234 |
| " | 6 | 2 | 1 | 9 | " | 0.0923 | 0.0328 | 0.0520 | 0.0243 |
| " | 6 | 2 | 0 | 8 | plane + ‖ax | 0.0569 | 0.0150 | 0.0118 | 0.0097 |
| plane + 2 pts † | 6 | 2 | 0 | 8 | "8 pt" F | 0.1879 | 0.0430 | 0.0758 | 0.0149 |
| " | 6 | 2 | 1 | 9 | " | 0.1482 | 0.0285 | 0.0385 | 0.0158 |
| " | 6 | 2 | 0 | 8 | plane + ‖ax | 0.1185 | 0.0184 | 0.0111 | 0.0105 |
| 2 ‖ planes | 4 | 4 | 0 | 8 | "8 pt" F | 0.8796 | 0.6716 | 0.6564 | 0.0431 |
| " | 4 | 4 | 1 | 10 | " | 0.0444 | 0.0189 | 0.0276 | 0.0100 |
| " | 4 | 4 | 0 | 8 | H → F | 0.6054 | 0.4609 | 0.0108 | 0.0097 |
| " | 4 | 4 | 0 | 8 | plane + ‖ax | 0.0685 | 0.0183 | 0.0113 | 0.0043 |
| 2 ‖ planes † | 4 | 4 | 0 | 8 | "8 pt" F | 0.1382 | 0.0335 | 0.0331 | 0.0141 |
| " | 4 | 4 | 1 | 10 | " | 0.0858 | 0.0235 | 0.0284 | 0.0128 |
| " | 4 | 4 | 0 | 8 | H → F | 0.9602 | 0.7081 | 0.3813 | 0.0076 |
| " | 4 | 4 | 0 | 8 | plane + ‖ax | 0.1709 | 0.0395 | 0.0457 | 0.0077 |
| 6 ‖ planes | 4 | 4 | 0 | 24 | "8 pt: F | 0.0761 | 0.0234 | 0.0169 | 0.0074 |
| " | 4 | 4 | 0 | 24 | H → F | 0.9459 | 0.7652 | 0.7907 | 0.0088 |
| " | 4 | 4 | 0 | 24 | plane + ‖ax | 0.8145 | 0.5312 | 0.4737 | 0.0078 |
| tilted cube | 4 | 4 | 1 | 10 | "8 pt" F | 0.1549 | 0.0307 | 0.0174 | 0.0091 |
| " | 4 | 4 | 2 | 13 | " | 0.1301 | 0.0265 | 0.0166 | 0.0076 |
| " | 4 | 4 | 0 | 7 | H → F | 0.1383 | 0.0237 | 0.0106 | 0.0079 |
| " | 4 | 4 | 0 | 7 | plane + ‖ax | 0.2070 | 0.0411 | 0.0377 | 0.0087 |

† Randoimzed data point placement the dispersion of the epipolar line constraints used to compute $F_{kl}$ in the linear method. We can then re-compute a rank-two $F_{kl}$ from its SVD by zeroing the smallest singular value (in the case of $E_{kl}$, we can also reset the two singular values to 1) (block 650 of FIG. 6). The next step is to compute the desired or "optimal" homography $H_{kl}^{\infty}=[e_{kl}]_\times F_{kl}$ [LV94] (block 660 of FIG. 6). Finally, the 3-D location of each point is obtained by triangulation from $H_{kl}^{\infty}$, $e_{kl}$, $u_{ik}$ and $u_{il}$ using equations (3) and (2) (block 680 of FIG. 6). Such a triangulation computation is readily carried out in accordance with well-known techniques.

Let's get a feel for how much additional points help by running some experiments. Table 5.1 shows the results of adding p hallucinated points per plane to our test data sets (parallel planes and tilted cube), and then running an 8-point method to reconstruct the data [Har97, Zha97]. (The n=6, m=2 and n=4, m=2 data sets actually only have a single plane for which a homography can be computed.) Table 5.1 illustrates the reconstruction error for algebraic initialization phase. In this table, n and m are the number of points on the even and odd planes planes (some points are shared along edges and vertices in the tilted cube), p is the number of extra points, and N is the total number of points. The Euclidean and affine reconstruction errors are for calibrated cameras; projective errors are for uncalibrated. The coplanarity error measures the Euclidean distance of points to their best-fit plane (calibrated reconstruction).

For the initially underconstrained data sets (n=4, m=2 two-plane and n=4 tilted cube), adding enough hallucinated points to get the minimum required 8 allows us to apply the 8-point method. For the first data set (n=4, m=2 two-plane), the result of hallucinating two additional correspondences is identical to the result of using plane+ parallax. For the second and third data sets (n=6, m=2 two-plane), plane plus parallax does better than hallucinating points. (The data sets in table 5.1 with a dagger (†) are randomized versions of our the homography-based method described in the next section. On the other hand, adding hallucinated points to data set which already have more than 8 points only gives a minor improvement. This suggests that having more than the minimal number of sample points is more important than fully exploiting all of the constraints available from our homographies.

5.2 Reprojecting Points Based on Homographies

A second approach to exploiting known coplanarity in the data set is to perturb the input 2D measurements such that they lie exactly on a homography. This seems like a plausible thing to do, e.g., projecting 3D points onto estimated planes is one way to "clean up" a 3D reconstruction. However, it is possible that this early application of domain knowledge may not be statistically optimal. Let's explore this idea empirically.

The simplest way to perform this reprojection is to first compute homographies between a plane in the kth frame and the 0th frame, and to then project the points from the first frame into the kth frame using this homography. This is equivalent to assuming that the points in the first frame are noise-free. Another approach is to find $u_{ik}^*$ such that they exactly satisfy the homographies and minimize the projected errors. Since the latter involves a complicated minimization, we have chosen to study the former, simpler idea. Methods to incorporate coplanarity as a hard constraint on the solution will be presented in Section 8.

Table 8 shows some results of reprojecting points in the second frame based on the computed homographies. A slight decrease in error is visible, but this technique does not perform as well as applying the co-planarity constraints directly during the bundle adjustment stage (Section 8).

6 Fundamental Matrices from Homographies

Assuming that we are given (or can estimate) the inter-frame homographies associated with two or more planes in the scene, there is a more direct method for computing the fundamental matrix [LF93].

Recall from (5) that the homography associated with a plane $n^T x - d = 0$ is $$H_{kl} \sim H_{kl}^\infty + d_l^{-1} e_{kl} \tilde{n}^T \quad (9)$$

and that the fundamental matrix (7) associated with the same configuration has the form $$F_{kl} \sim [e_{kl}]_\times H_{kl}^\infty. \quad (10)$$

The product $$H_{kl}^T F_{kl} \sim H_{kl}^{\infty T} [e_{kl}]_\times H_{kl}^\infty + d_l^{-1} \tilde{n} e_{kl}^T [e_{kl}]_\times H_{kl}^\infty = H_{kl}^{\infty T} [e_{kl}]_\times H_{kl}^\infty$$

is skew symmetric, and hence $$S = H_{kl}^T F_{kl} + F_{kl}^T H_{kl} = 0. \quad (11)$$

Writing out these equations in terms of the entries $h_{ij}$ and $f_{ij}$ of H and F (we'll drop the kl frame subscripts) gives us $$s_{ij} = \sum_k h_{ki} f_{kj} + f_{ki} h_{kj} = 0, \quad \forall (i, j). \quad (12)$$

Each known plane homography H contributes six independent constraints on F, since the matrix $H^T F + F^T H$ is symmetric, and hence only has six degrees of freedom. Using two or more plane homographies, we can form enough equations to obtain a linear least squares problem in the (untries in F.

While this idea is quite simple, Luong and Faugeras [LF93] report that the technique is not very stable (it only yields improvements over a point-based technique for two planes). Can we deduce why this method performs poorly?

Instead of using (11) to solve for F, what if we "hallucinate" point correspondences based on the known homographies. Say we pick an image point $u = (u_0, u_1, u_2)$ and project it to $u' = (v_0, v_1, v_2) = Hu$, i.e., $v_k = \Sigma_i h_{ki} u_i$. The resulting constraint on F (6) has the form $$\sum_{ij} v_k f_{kj} u_j = \sum_{ijk} f_{kj} h_{ki} u_i u_j = 0. \quad (13)$$

By choosing appropriate values for $(u_0, u_1, u_2)$, we can obtain elements (or combinations of the elements) of the symmetric S matrix in (11). For example, when $u = \delta_i$, we get $$\sum_k f_{ki} h_{ki} = \frac{1}{2} s_{ii}. \quad (14)$$

Thus, three of the constraints used by [LF93] correspond to sampling the homography at points (1,0,0),(0,1,0), and (0,0,1), two of which lie at infinity! Similarly, for $u = \delta_i + \delta_j, i \neq j$, we get $$\sum_k f_{ki} h_{ki} + f_{ki} h_{kj} + f_{kj} h_{ki} + f_{kj} h_{kj} = \frac{1}{2} s_{ii} + \frac{1}{2} s_{jj} + s_{ij}. \quad (15)$$

Thus, the remaining three constraints used by [LF93] are linear combinations of constraints corresponding to three sample points, e.g., (0,1,1), (0,1,0), and (0,0,1). Again, each constraint uses at least one sample point at infinity! This explains why the technique does not work so well. First, the homographies are sampled at locations where their predictive power is very weak (homographies are most accurate at predicting the correspondence within the area from which they were extracted). Second, the resulting sample and projected points are far from having the kind of nice unit distribution required for total least squares to work reasonably well.

Figure 7A:
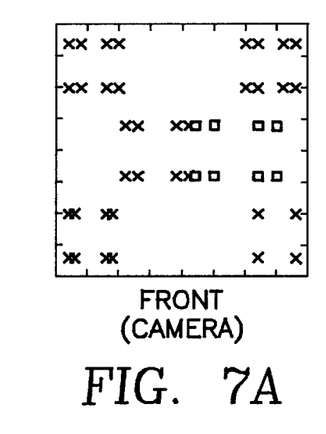
FIGS. 7A and 7B illustrate front and top views, respectively, of an experimental data set of points clustered onto six fronto-parallel planes.
Figure 7B:
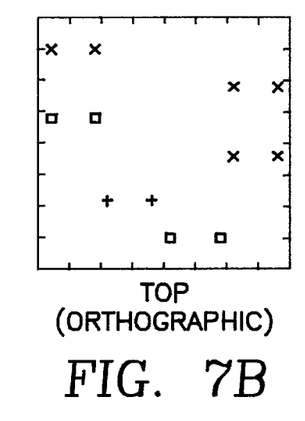
Figure 8A:
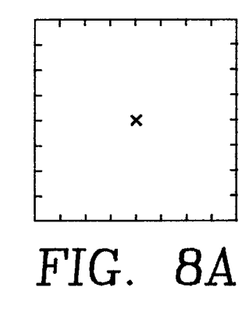
FIGS. 8A through 8F illustrate experimental data sets for data sets of n points, where n ranges from 1 through 6, respectively.
Figure 8B:
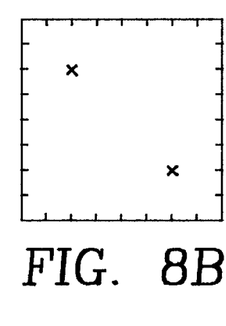
Figure 8C:
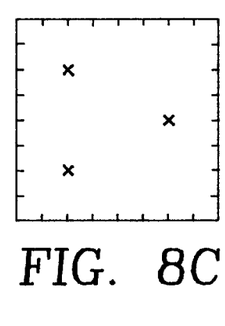
Figure 8D:
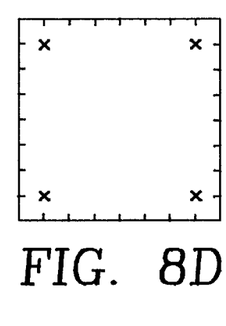
Figure 8E:
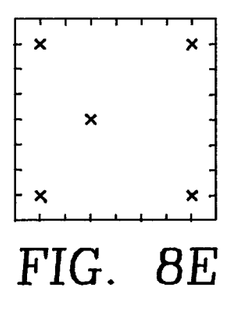
Figure 8F:
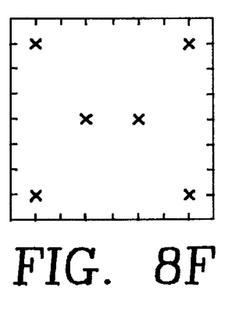

To demonstrate the overall weakness of this approach, we show the reconstruction error using the method of [LF93]. From these results, we can see that the approach is often significantly inferior to simply sampling the same homography with sample points in the interior of the region from which it was extracted. As shown in Table 5.1, the homography based method (H→F) fails to give a useful answer on the two-parallel-plane data sets. It also fails on a six-plane data set illustrated in FIGS. 7A (front view) and 7B (top view), which is representative of the kind of data used in [LF93], where they partitioned the image into regions and then scattered coplanar points within each region. For the tilted cube, however, the homography-based method works reasonable well. At the moment, we do not yet understand the discrepancy between the fronto-parallel and tilted cube data set results. A plausible conjecture is that fronto-parallel data, whose "vanishing points" lie at far away from the optical center, are more poorly represented by an H matrix.

7 Plane Plus Parallax

Another traditional approach to exploiting one or more homographies between different views is to choose one homography as the dominant motion, and to compute the residual parallax, which should point at the epipole. Such plane plus parallax techniques [KAH94, Saw94a, Savw94b, SN94, SC94] are usually used to recover a projective description of the world, although some work has related the projective depth (magnitude of the parallax) to Euclidean depth [Saw94b, IA96].

To compute the fundamental matrix, we close one of the homographies, say the first one, and use it to warp all points from one from to the other. We then compute the epipole by minimizing the sum of squared triple products, $(x_i, x'_i, e)^2$, where $x_i$ and $x_i$ are corresponding (after transfer by homography). (The triple product measures the distance of e from the line passing through $x_i$ and $x'_i$, weighted by the length of this line segment.) Once e has been determined, we use (10) to compute $F_{kl}$.

Table 5.1 shows the results of using the plane plus parallax to recover the 3D structure for some of our data sets. The method works well when the points are mostly on the plane used for the homography (n=4 or 6, m=2), but not as well when the points are evenly distributed over several planes. This is not surprising. Plane plus parallax privileges one plane over all others, forcing the fundamental matrix to exactly match that homography. When the data is more evenly distributed, a point- based method (with hallucination, if necessary) gives better results.

8 Global Optimization (Bundle Adjustment)

The final technique we examine in this specification is the one traditionally used by photogrammetrists, i.e., the simultaneous optimization of 3D point and camera placements by minimizing the squared error between estimated and measured image feature locations.

There are two general approaches to performing this optimization. The first interleaves structure and motion estimation stages [Har97]. This has the advantage that each point (or frame) reconstruction problem is decoupled from the other problems, thereby solving much smaller systems. The second approach simultaneously optimizes for structure and motion [SK94]. This usually requires fewer iterations, because the couplings between the two sets of data are made explicit, but requires the solution of larger systems. In this specification, we adopt the former approach.

To reconstruct a 3D point location, we minimize $$\sum_k \left(u_{ik} - \frac{p_{k0}^T \tilde{x}_i}{p_{k2}^T \tilde{x}_i}\right)^2 + \left(v_{ik} - \frac{p_{k1}^T \tilde{x}_i}{p_{k2}^T \tilde{x}_i}\right)^2 \quad (16)$$

where $p_{kr}$ are the three rows of the camera matrix $$P_k = V_k[R_k | -t_k]$$

and $\tilde{x}_i = [x_i | 1]$, i.e., the homogeneous representation of $x_i$. As pointed out by [Zha97], this is equivalent to solving the following overconstrained set of linear equations, $$D_{ik}^{-1}(p_{k0} - u_{ik} p_{k2})^T \tilde{x}_i = 0 \quad (17)$$

$$D_{ik}^{-1}(p_{k1} - v_{ik} p_{k2})^T \tilde{x}_i = 0,$$

where the weights are given by $D_{ik} = p_{k2}^T \tilde{x}_i$ (these are set to $D_{ik} = 1$ in the first iteration). Since these equations are homogeneous in $\tilde{x}_i$, we solve this system by looking for the rightmost singular vector of the system of equations [GV96].

The Levenberg-Marquardt method [PFTV92] leads to a slightly different set of equations $$D_{ik}^{-1}(p_{k0} - \hat{u}_{ik} p_{k2})^T \delta \tilde{x}_i = u_{ik} - \hat{u}_{ik},$$

where $\hat{u}_{ik}$ is the current estimate of $u_{ik}$ and $\delta \tilde{x}_i$ is the desired update to $\tilde{x}_i$. In practice, the two methods perform about as well [Zha97].

The same equations can be used to update our estimate of $P_k$, by simply grouping equations with common $k$s into separate systems. When reconstructing a Euclidean ($V_k[R_k | -t_k]$) description of motion, the estimation equations become more complicated. Here, applying a linearized least squares like the Levenberg-Marquardt method is more fruitful. Let us assume the following updates $$R_k \leftarrow R_k(I + [\omega_k]_\times), t_k \leftarrow t_k + \delta t_k. \quad (18)$$

We can compute the terms in $$P_k + \delta P_k = V_k[R_k(I + [\omega_k]_\times) | -(t_k + \delta t_k)] \quad (19)$$

as functions of $V_k$, $R_k$, $t_k$, i.e., the Jacobian of the twelve entries in $\delta P_k$ with respect to $\omega_k$ and $\delta t_k$. We can then solve the system of equations $$D_{ik}^{-1} \tilde{x}_i^T (\delta p_{k0} - \hat{u}_{ik} \delta p_{k2}) = u_{ik} - \hat{u}_{ik} \quad (20)$$

$$D_{ik}^{-1} \tilde{x}_i^T (\delta p_{k1} - \hat{v}_{ik} \delta p_{k2}) = v_{ik} - \hat{v}_{ik},$$

substituting the $\delta p_k$ with their expansions in the unknowns ($\omega_k$, $\delta t_k$). The rotation and translation estimates can then be updated using (18), using Rodriguez's formula for the rotation matrix [Aya89], $$R \leftarrow R(I + \sin\theta [n]_\times + (1 - \cos\theta)[n]_\times^2)$$

with $\theta = \|\omega\|$, $n = \omega/\theta$. A similar approach can be used to update the focal length, or other intrinsic calibration parameters, if desired.

The above discussion has assumed that each point can be

| data set | n | m | p | N | method | Euclidean | affine | projective | coplanarity |
|---|---|---|---|---|---|---|---|---|---|
| 2 ∥ planes | 5 | 5 | 0 | 10 | "8 pt" F | 0.0538 | 0.0226 | 0.0322 | 0.0144 |
| " | 5 | 5 | 0 | 10 | reproject | 0.0484 | 0.0189 | 0.0281 | 0.0114 |
| " | 5 | 5 | 0 | 10 | H → F | 0.5516 | 0.3698 | 0.0146 | 0.0163 |
| " | 5 | 5 | 0 | 10 | plane + ∥ax | 0.0673 | 0.0189 | 0.0142 | 0.0079 |
| " | 5 | 5 | 0 | 10 | bundle adj. | 0.0467 | 0.0170 | 0.0167 | 0.0092 |
| " | 5 | 5 | 0 | 10 | plane enf. | 0.0392 | 0.0117 | 0.0075 | 0.0000 |
| " | 5 | 5 | 0 | 10 | plane constr. | 0.0384 | 0.0081 | — | 0.0000 | solved for independently. What about points that are known to be coplanar? Here, we need to incorporate constraints of the form $n_p^T x_i - d_p = 0$, $\{i \in \Pi_p\}$. Two approaches come to mind. The first is to alternate a plane estimation stage with the point reconstruction stage. The second is to simultaneously optimize the point positions and plane equations. We describe the former, since it is simpler to implement.

Fitting planes to a collection of 3D points is a classic total least squares problem [HV91, GV96]. After subtracting the centroid of the points, $\bar{x}_p$, we compute the singular value decomposition of the resulting deviations, and choose the rightmost singular vector as the plane equation. We then set $d_p = n_p^T \bar{x}_p$.

To enforce this hard constraint on the point reconstruction stage, we add the equation $n_p^T x_i - d_p = 0$. to the system (18) as a linear constraint [LH74, GV96]. Since points may end up lying on several planes, we use the method of weighting approach to constrained least squares [GV96, p. 586], i.e., we add the constraints $n_p^T x_i - d_p = 0$ to the set of equations for $x_i$ with a large weight (currently $2^{60} \approx 10^{20}$).

Table 8 shows the results of applying bundle adjustment to the initial structure and motion estimates computed using an 8-point method. This table is illustrative of the reconstruction errors for bundle adjustment and constrained optimization. The description of the variables is the same as that of Table 1.

In addition to grouping points onto planes, we can apply additional constraints on the geometry of the planes themselves. For example, if we know that two or more planes are parallel, then we can compute a single normal vector for all the "coplanar" points after their individual centroids have been subtracted.

The line corresponding to method "plane constr." in Table 8 shows the result of applying a parallelism constraint to our fronto-parallel data set. The results are not all that different from not using the constraint.

Currently, we are also investigating how applying knowledge about perpendicularity can also be used to improve the quality of the results. Our conjecture is that this constraint can be used to effectively remove the kinds of "bas-relief uncertainties" often seen when the range of motions is not very large [SK97].

Lastly, if planes have explicitly known orientations (e.g., full constraints in the case of ground planes, or partial constraints in the case of vertical walls), these too can be incorporated. However, a global rotation and Translation of coordinates may first have to be applied to the current estimate before these constraints can be enforced.

9 Experiments

We have performed an extensive set of experiments to validate our methods and to test the relative merits of various approaches. Our experimental software first generates a 3D dataset in one of three possible configurations: a set of fronto-parallel planes filling the field of view (FIGS. 3A and 3B), a set of fronto-parallel planes in non-overlapping regions of the image (FIGS. 7A and 7B), or a tilted cube (FIGS. 4A and 4B). On each of the planes, we generate from 1 to 6 sample points, in the configurations shown in FIGS. 8A through 8F. We can also optionally add random noise to the point positions, in order to avoid the generation of points in critical configurations.

The 3D configuration of points is projected onto the camera's image plane. For our current experiments, we rotate the data around the y axis in increments of 10°, and place the camera 6 units away from the data (the data itself fills a cube spanning $[-1, 1]^3$). (This is equivalent to a camera with a 19° field of view.) We then generate 50 noise-corrupted versions of the projected points (for the experiments described in this specification, $\sigma=0.2$ pixels, on a 200×200 image), and use these as inputs to the reconstruction methods. The mean RMS reconstruction error across all 50 trials is then reported.

The reconstruction errors are computed after first finding the best 3D mapping (Euclidean, similarity, define, or projective) from the reconstructed data points onto the known ground truth points. The columns labeled "Euclidean" and "affine" in Tables 5.1–8 measure the errors between data reconstructed using calibrated cameras and the ground truth after finding the best similarity and affine mappings. The columns labeled "projective" measure the errors for uncalibrated cameras after the best 3D projective mapping. The coplanarity error is computed by finding the best 3D plane fit to each coplanar set of reconstructed points (calibrated camera), and then measuring the distances to the plane.

Tables 5.1–8 are a representative sample from our more extensive set of experiments, which highlight the relative strengths and weaknesses of various approaches.

10 Discussion and Conclusions

In this specification, we have presented a number of techniques for exploiting the geometric knowledge typically available in structure from motion problems. In particular, we have focused on how to take advantage of knowns coplanarities in the data. Our techniques also enable us to directly exploit homographies between different regions of the image, when these are known.

The techniques we examined are:

1. Hallucinate (additional) correspondences in regions where planar structures or homographies are given.
2. Reproject points to exactly satisfy a given or computed homography.
3. Directly use the homography to compute the fundamental matrix using a variant of the 8-point method.
4. Estimate a projective reconstruction based on a dominant homography and residual parallax ("plane plus parallax").
5. Bundle adjustment (global optimization), with optional coplanarity enforcement.
6. Enforce additional geometric constraints such as parallelism or perpendicularity between certain planes.

Of these techniques, hallucinating additional correspondences is simple to implement, and often yields a significant improvement in the results, especially in situations which are initially data-poor. Reprojecting the data to exactly fit the homography does not appear to significantly improve the results. Using homographies to directly estimate the fundamental matrix sometimes works, but also often fails dramatically; using hallucinated correspondences seems like a more prudent approach.

Bundle adjustment improves the results obtained with the 8-point method, but often not by that much. Adding coplanarity as a hard constraint does not seem to make a significant difference in the accuracy of the reconstruction, although it does make the reconstruction look smoother. Adding parallelism as a geometric constraint does not seem to improve the results that much. On the other hand, adding perpendicularity constraints should lead to a significant improvement in the results (due to the expected reduction in the bas-relief ambiguity).

These results suggest that adding hallucinated correspondences to planar grouping of points (or hallucinating correspondences in regions with known homographies) is a useful and powerful idea which improves structure from motion results with very little additional complexity. Similarly, geometric constraints (coplanarity, parallelism, and perpendicularity) can be added to the bundle adjustment stage with relatively little effort, and can provide significantly improved results.

10.1 Future Work

This specification has concentrated on the geometric constraints available from knowing that certain points are coplanar. Similar constraints are available for points which are known to be collinear. The situation, however, is often a little different: line matching methods often do not localize the endpoints of lines in each image, so there may be no initial points in correspondence, nor is it possible to hallucinate such correspondences prior to an actual reconstruction. However, exploiting known orientations for lines (e.g., vertical and horizontal), and geometric constraint between their orientations (parallelism and perpendicularity) is indeed possible, and can lead to methods which reconstruct a 3D scene from a single view.

In terms of points on planes, our current results could be extended in a number of directions. First, we have not yet explored the use of multi-frame algebraic approaches such as trilinear tensors [Sha94*b*]. Second, we have not explored multi-frame bundle adjustment techniques, nor have we explored the use of robust estimation techniques, [TM97]. Hallucinating correspondences should be equallyr applicable to both of these approaches. We would also like to better understand the differences in results obtained from fronto-parallel and oblique planes, and in general to anticipate the expected accuracy of results for various geometric configurations and camera motions.

What is claimed is:

1. A method for computing 3-dimensional point locations on a 3-dimensional object from two different views of the object, comprising:

defining an initial set of image pixels corresponding to points on a generally planar surface of said object visible in both of said views;

assigning additional pixels to said planar surface in both of said views;

computing an optimal homography and an epipole from pixels visible in both said views including said additional pixels;

establishing from said optimal homography a triangulation of common points on said object; and determining from said triangulation a 3-dimensional location of points on said object.

2. The method of claim 1 wherein the step of assigning additional pixels comprises:

computing an initial homography between said views from said initial set of image pixels;

assigning additional pixels in one of said views;

computing from said initial homography pixels in the other view corresponding to said additional pixels in the one view whereby an additional pixel location corresponding to a point on a planar surface on said object is assigned to each of said views.

3. The method of claim 2 wherein each of said additional pixels lies in a neighborhood of the set of initial pixels on said planar surface.

4. The method of claim 1 wherein the step of computing an optimal homography and an epipole comprises:

computing a fundamental matrix from said pixels including said additional pixels;

estimating an epipolar line between said two views;

computing said homography and an epipole from said fundamental matrix and said epipolar line.

5. A method for computing 3-dimensionial point on an object visible in images taken from different views of said object, said method comprising:

identifying at least one set of initial pixels visible in both said views lying on a generally planar surface on said object;

computing from said set of initial pixels an estimated homography between said views;

defining at least an additional pixel on said one surface in one of said images and computing from said estimated homography a corresponding additional pixel in the other view;

computing an optimal homography and an epipole from said initial and additional pixels;

computing 3-dimensional locations of points on said object by triangulation between said views of corresponding ones of said pixels.

6. The method of claim 5 wherein each of said initial pixels in one of said views corresponds to one of the initial pixels in the other of said views and both correspond to a point on said object.

7. A method for reconstructing a three-dimensional object having at least one generally planar surface from at least two images of said object taken from different views from which said planar surface is visible, each of said images including a set of pixels corresponding to a set of points on said planar surface of said object, said method comprising:

designating in said two images additional pixel or pixels on said planar surface;

computing from said set of pixels and from said additional pixels in said two images a transformation between said two images; and computing from said transformation the motion between said two images of points on said surface, and deducing from said motion the three-dimensional coordinates of said points on said planar surface.

8. The method of claim 7 wherein the step of designating comprises:

computing from said set of pixels on said planar surface an estimated transformation between said two images;

designating at least an additional pixel in one of said two images;

computing from said estimated transformation the corresponding additional pixel in the other of said two images, whereby for a point on said planar surface of said object the additional pixel is defined in both of said two images.

9. The method of claim 7 wherein said transformation between said two images is a homography.

10. The method of claim 7 wherein said additional pixels lie in a neighborhood of said set of pixels in each of said two images.

* * * * *

UNITED STATES PATENT AND TRADEMARK OFFICE
CERTIFICATE OF CORRECTION

PATENT NO. : 6,137,491
DATED : October 24, 2000
INVENTOR(S) : Richard S. Szeliski It is certified that error appears in the above-identified patent and that said Letters Patent is hereby corrected as shown below:

Column 1,
Line 25, change "homograpties" to -- homographies --;

Column 15,
Line 28, change "(untries" to -- entries --;

Column 16,
Line 28, change "savw94b" to -- saw94b --;
Line 33, change "close" to -- choose --;

Column 17,
Line 62, change equation to read:
$$-- D_{ik}^{-1} \tilde{x}_j^T (\delta p_{k1} - \hat{v}_{ik} \delta p_{k2}) = v_{ik} - \hat{v}_{ik}, --;$$

Column 19,
Line 28, change "define" to -- affine --; and

Column 20,
Line 46, change "equallyr" to -- equally --.

Signed and Sealed this

Sixth Day of November, 2001

Attest:

NICHOLAS P. GODICI
*Attesting Officer*  *Acting Director of the United States Patent and Trademark Office*